United States Patent Office 3,378,108
Patented Apr. 16, 1968

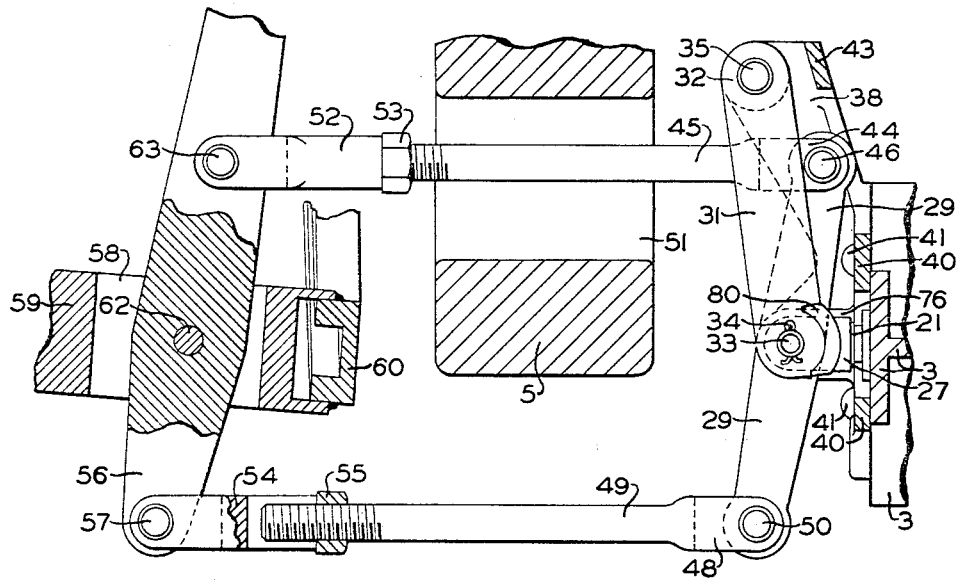
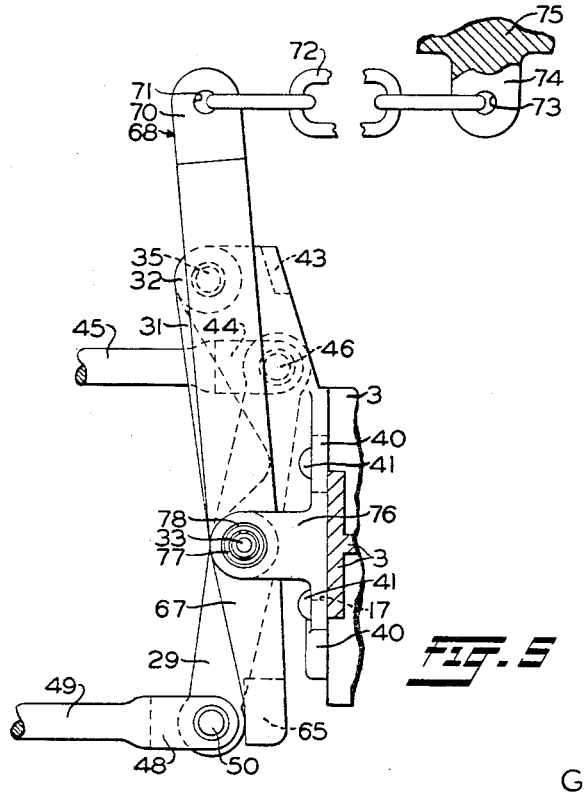

3,378,108
FLUID PRESSURE OPERATED BRAKE APPA-
RATUS FOR RAILWAY CAR TRUCKS
Glenn T. McClure, McKeesport, and William K. Mong,
Irwin, Pa., assignors to Westinghouse Air Brake Com-
pany, Wilmerding, Pa., a corporation of Pennsylvania
Filed Sept. 13, 1966, Ser. No. 579,142
10 Claims. (Cl. 188—52)

ABSTRACT OF THE DISCLOSURE

A brake rigging for a two-axle four-wheel railway car truck which embodies a brake-cylinder-carrying brake beam operatively connected to a conventional truss type brake beam through a parallelogram type of linkage whereby, upon the supply of fluid under pressure to the brake cylinder device, the two brake beams are moved in opposite directions to cause the application of the brake shoes on the beams to the tread surface of each wheel of the car truck with the same brake applying force.

---

One of the present day brake riggings for four wheel railway car trucks consists of two parallel brake beams each carrying a brake cylinder device, the cylinder device on each brake beam being provided with a piston having a piston rod which is operatively connected to the other brake beam so that the brake beams are moved in opposite directions respectively by the fluid pressure forces acting in opposite directions on the bodies of the brake cylinder devices and the respective pistons of these cylinder devices. Such a brake rigging is shown in Patent No. 2,958,398 issued Nov. 1, 1960 to George K. Newell and assigned to the assignee of the present application.

When the above-mentioned present day type of brake rigging is utilized to convert an older style foundation brake rigging, it is necessary that the two existing truss-type brake beams on each car truck be discarded and replaced by two new brake-cylinder-carrying brake beams. It would be desirable, in converting older style brake riggings to the above-mentioned modern style rigging, that one of the existing truss-type brake beams be utilized inasmuch as the cost of conversion would thereby be reduced. Also, on new installations, it would be desirable if a combination of an old style relatively low cost truss-type brake beam and a new style relatively higher cost type brake beam could be utilized on each car truck in the interest of over-all cost reduction.

It is the general purpose of this invention to provide a novel brake rigging for railway car trucks, basically similar in operational principle to the above-mentioned present day type, but utilizing a simpler and relatively lower cost arrangement involving only one brake-cylinder-carrying brake beam associated with a non-brake-cylinder-carrying brake beam through a single linkage which is actuable through fluid pressure forces exerted by the brake cylinder or through manually applied forces.

It is a further purpose of this invention to provide a car truck brake rigging arrangement of the above-mentioned novel type which requires replacement of only one of the existing truss-type brake beams with the newer style brake-cylinder-carrying brake beams and which also utilizes a single linkage associating the two brake beams in a manner such that operation thereof may be effected manually without requiring an additional separate linkage for hand or manual operation.

More particularly, according to the present invention, this novel brake rigging includes a conventional truss-type brake beam and a brake beam carrying a single brake cylinder device substantially midway its length the piston rod of which is operatively connected by a parallelogram type of linkage to the truss-type brake beam and operable upon the supply of fluid pressure to the brake cylinder device to effect movement of the brake beams in opposite directions to cause the application of the same brake applying force to the tread surface of each wheel of the car truck. The parallelogram type of linkage includes a lever, fulcrumed on the truss-type brake beam, to which lever the hand brake wheel located at the corresponding end of the car may be operably connected by any suitable means whereby the brakes can be applied manually by a force transmitted from the hand brake wheel through this linkage to the two brake beams.

In the accompanying drawings:

FIG. 4 is an elevational view, partially in section, showing a parallelogram type of linkage by which the two brake beams shown in FIG. 1 are connected.

FIG. 5 is an elevational view, substantially in outline, showing how the hand brake mechanism is anchored to the bottom of a railway car and operatively connected to the parallelogram type of linkage shown in FIG. 4.

Description

Figure 1:
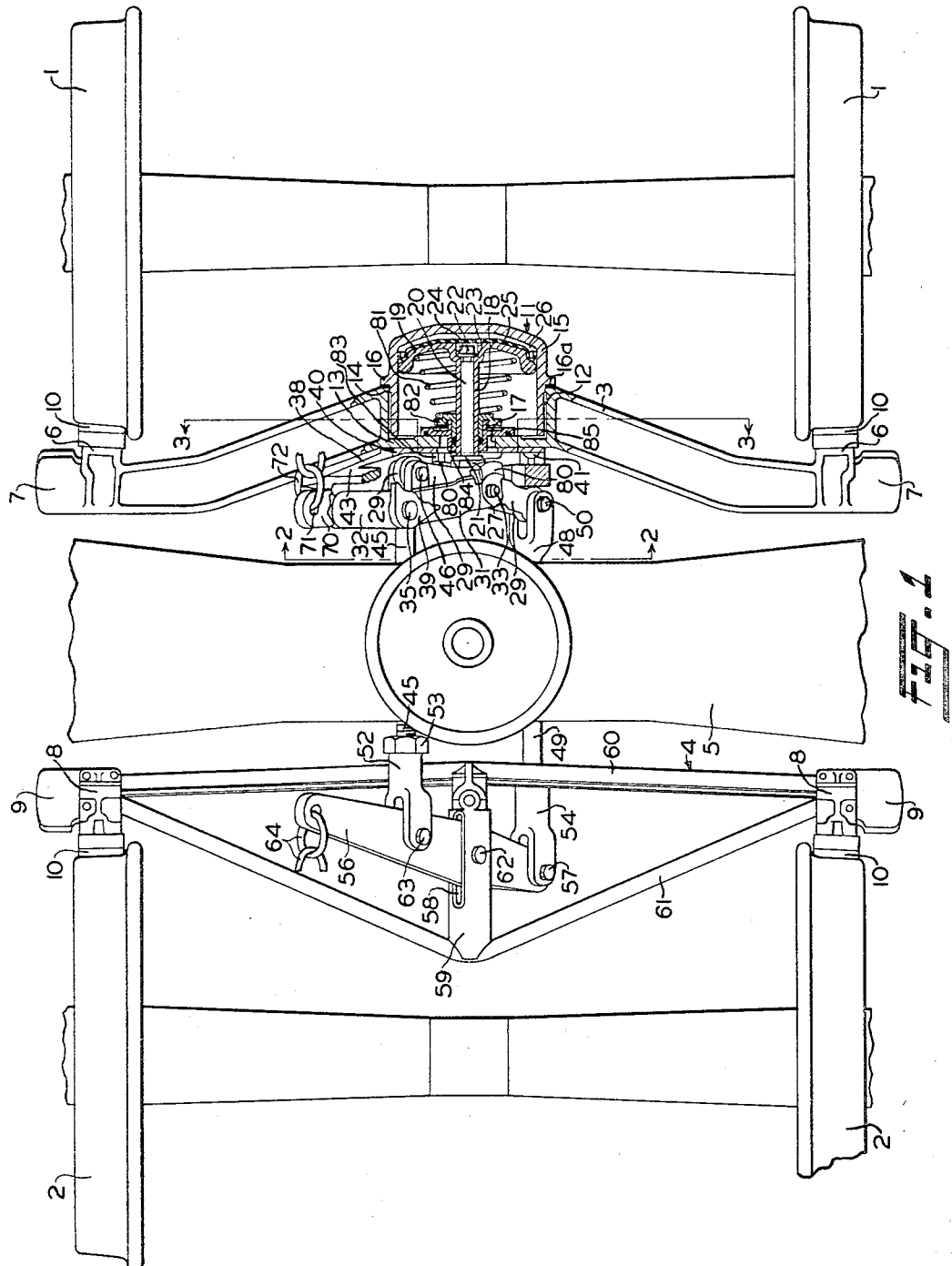
FIG. 1 is a plan view, partially in section, of a brake rigging for a two-axle four-wheel car truck, showing the manner by which a single brake cylinder device is mounted on a brake-cylinder-carrying brake beam and operatively connected to a conventional truss-type brake beam.

Referring to FIG. 1 of the drawings, the reference numerals 1 and 2 designate respectively the wheels secured at opposite ends of each of two axles of a two-axle four-wheel railway car truck.

The brake rigging shown in the drawings comprises a cast brake cylinder-carrying brake beam 3 and a conventional truss-type brake beam 4 which brake beams extend crosswise of the car truck and in parallel spaced relation to each other and to a truck bolster 5. The brake beams 3 and 4 are symmetrically arranged on opposite sides of the truck bolster 5 and are movably supported at each end on the side frame members (not shown) of the truck in the usual conventional manner.

The brake beam 3 is constructed, as hereinafter described, to provide a support for a single brake cylinder device, and the brake beam 4 may be any commercial strut type brake beam.

A brake head 6 is cast integral with each end of the cast brake beam 3 adjacent to and on the inboard side of a guide foot 7 which also may be cast integral with the beam 3. Each foot 7 is a flat L-shaped metal member having a leg that is slidably supported in a grooved wear plate and guide member (not shown) which is secured to a corresponding truck side frame member. The truss-type brake beam 4 is also provided adjacent each end with a brake head 8 which is riveted or otherwise attached thereto adjacent to and on the inboard side of a guide foot 9 that may be secured to the brake beam 4 by the same rivets used to secure the brake head 8 to this brake beam. These guide feet 9 are supported in the same manner as described above for the guide feet 7. The wear plate and guide members and guide feet serve to support the brake beams 3 and 4 at the proper height above the rails (that is somewhat below the horizontal diameter of the wheels), the groove in the wear plate and guide member being at a slight angle to the horizontal to permit bodily movement of the brake beams in a direction substantially radially of the associated wheels when a brake application is made.

Each of the brake heads 6 and 8 carries a composition brake shoe 10 for contact with the tread of an associated wheel. In customary manner the shoe has a backing plate provided with a key bridge to receive the usual brake shoe key (not shown) for removably locking the shoe to the brake head.

The brake shoes 10 are operated into and out of contact with their associated wheels 1, 2 by means of a single fluid pressure or brake cylinder device 11 which is secured to the brake beam 3 in a manner now to be described.

In order to secure the brake cylinder device 11 to the brake beam 3, the web of a somewhat bowed cast H-beam or channel constituting the brake beam 3 has formed integral therewith substantially midway its length a circular opening 12. As shown in FIG. 1 of the drawings, the respective opposite ends of this opening 12 are provided with inturned flanges 13 and 14. The inturned flange 14 forms a circular opening substantially the same diameter as the outside diameter of a cup-shaped body 15 of the brake cylinder device 11 which body is provided intermediate its ends with an out-turned flange 16 between which and the inturned flange 14 is disposed a gasket 16a constructed of any suitable resilient material. The out-turned flange 16 and the gasket 16a are provided with a plurality of arcuately spaced smooth bores (not shown) through which extend a plurality of cap screws (not shown) that have screw-threaded engagement with corresponding screw-threaded bottom bores (not shown) provided in that portion of the brake beam 3 extending circumferentially of the opening 12 therein.

The inturned flange 13 constitutes a non-pressure head for the brake cylinder device 11. This non-pressure head has therein a bore 17 through which a hollow rod 18 extends, the right-hand end of which is integral with a piston 19 that is slidably mounted in the cup-shaped body 15 of the brake cylinder device 11. The hollow rod 18 is adapted to receive therein a push rod 20 having thereon intermediate its ends a collar 21 which is forced against the left-hand end of the hollow rod 18 by a nut 22 that has screw-threaded engagement with external screw threads formed on a screw-thread portion of the push rod 20 adjacent the right-hand end thereof it being noted that a washer 23 is interposed between the nut 22 and a shoulder formed by the left-hand end of a counter-bore 24 provided in the piston 19 and coaxial with the hollow rod 18 which is integral with this piston.

A packing cup 25 is secured to the right-hand side of the piston 19 and cooperates with the cup-shaped body 15 to form a pressure chamber 26 to which fluid under pressure may be supplied in any suitable manner (not shown) from the usual brake control valve device of the air brake system on railway cars. Fluid under pressure supplied to the pressure chamber 26 causes movement of the brake cylinder body 15 and the brake beam 3 in one direction, and the piston 19, push rod 20 and the brake beam 4 in the opposite direction to effect braking contact of the brake shoes 10 carried by the beams 3 and 4 with the tread surface of their respective associated wheels, the movement of the piston 19 and push rod 20 being transmitted to the brake beam 4 through a parallelogram type of linkage now to be described.

Figure 2:
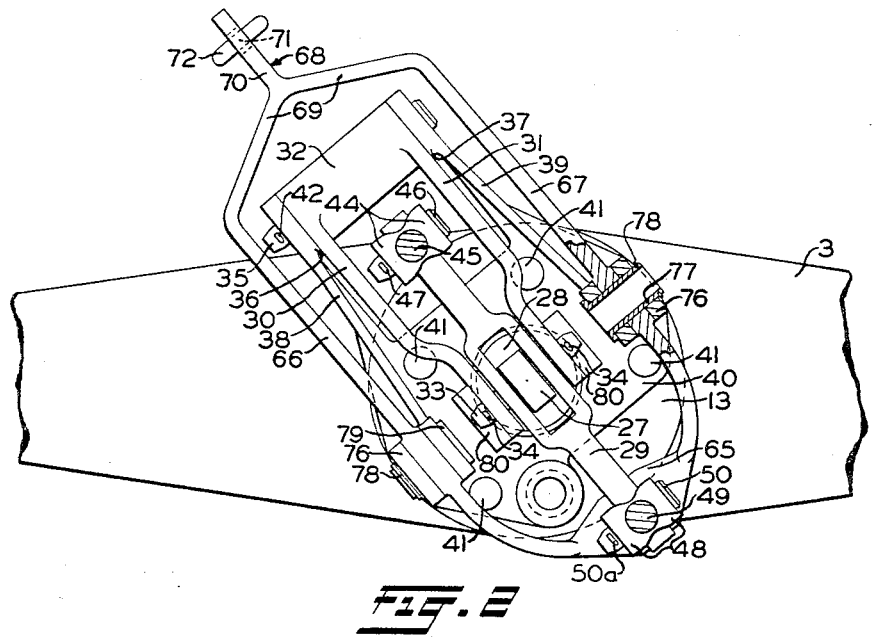
FIG. 2 is a vertical cross-sectional view, on enlarged scale, taken along the line 2—2 of FIG. 1 and looking in the direction of the arrows, showing certain details of a hand brake mechanism and how it is operatively connected to the piston rod of the brake cylinder device shown in FIG. 1.
Figure 3:
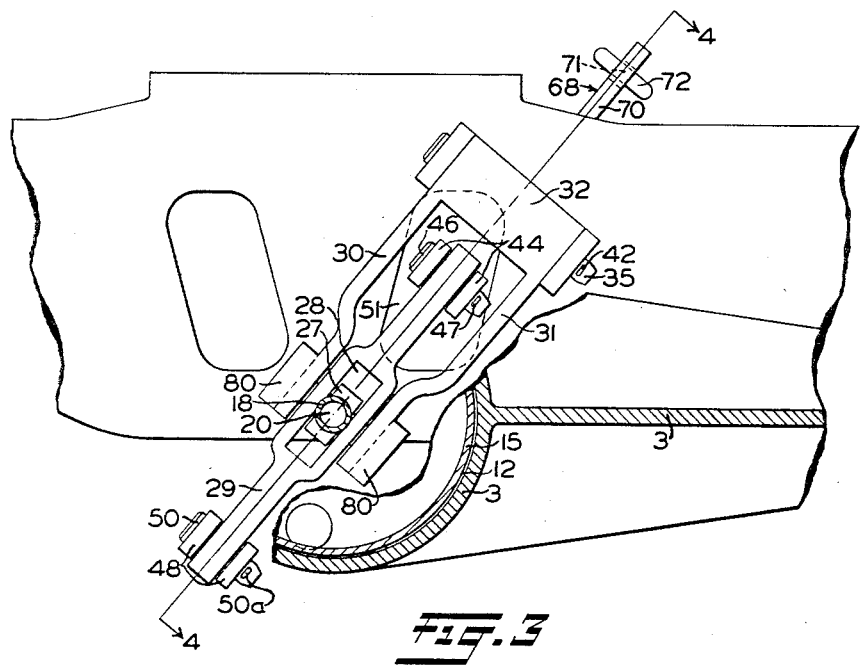
FIG. 3 is a vertical cross-sectional view, on enlarged scale, taken along the line 3—3 of FIG. 1 and looking in the direction of the arrows, showing certain structural details not made apparent in FIGS. 1 and 2.

The push rod 20 is provided on the left-hand side of the collar 21, as viewed in FIG. 1 with a fulcrum member 27 which also appears in FIGS. 2, 3 and 4 of the drawings. This fulcrum member 27 is rectangular in cross section and is disposed in an elongated slot 28 formed in a first obliquely arranged lever 29 of the above-mentioned parallelogram type of linkage the center of the slot 28 being substantially midway the ends of the lever 29. The fulcrum member 27 of the push rod 20 and the lever 29 are disposed between and operatively connected to a pair of parallel spaced-apart and offset arms 30 and 31 of a bifurcated hanger member 32 as by, for example, a pin 33 and a pair of cotter pins 34. The upper ends of the arms 30 and 31 are integral with a hub member which is rockably mounted on a headed pin 35. The opposite ends of the pin 35 are carried in coaxial bores in a pair of oppositely arranged and inwardly facing bosses 36 and 37 (FIG. 2) formed respectively on the upper ends of a pair of spaced-apart inclined support members 38 and 39 the lower ends of which are integral with a bracket member 40 that is secured to the hereinbefore-mentioned inturned flange 13 of the brake beam 3 by a plurality of rivets 41. The pin 35 adjacent the end thereof opposite its head is provided with a bore in which is received a cotter pin 42 that prevents removal of the pin 35 by vibration occurring while a train is traveling at a high speed.

The upper ends of the inclined support members 38 and 39 are connected by a web 43 a portion of which appears in FIGS. 1 and 4 of the drawings this web serving to provide rigidity to these support members.

As shown in FIGS. 2, 3, 4, and 5, the upper end of the lever 29 is disposed between the jaws of a clevis 44 formed on the right-hand end of a first link or rod 45 (FIG. 4) and pivotally connected thereto by means such as, for example, a headed pin 46 and a cotter pin 47 (FIGS. 2 and 3). The lower end of the lever 29 is disposed between the jaws of a clevis 48 formed on the right-hand end of a second link or rod 49 and pivotally connected thereto by means such as, for example, a headed pin 50 and a cotter pin 50a (FIGS. 2 and 3).

As shown in FIG. 4, the first or upper rod 45 extends through a window or opening 51 formed in the bolster 5. The left-hand end of the rod 45 is provided with external screw threads which have screw-threaded engagement with internal screw threads formed in one end of a clevis 52. The length of the rod 45 can be varied to provide for the proper clearance between the brake shoes 10 carried by the brake beam 4 and the corresponding wheels 2 by rotating the clevis 52 relative to the rod 45 after which a lock nut 53 having screw-threaded engagement with the screw threads on the rod 45 is forced against the right-hand end of the clevis 52 to lock it in its adjusted position.

Like the rod 45, the left-hand end of the rod 49 is provided with external screw threads for receiving a clevis 54 and a lock nut 55 whereby the length of this rod 49 can also be varied to provide proper brake shoe clearance. Furthermore, the lengths of the rods 45 and 49 can be adjusted so that two levers of the hereinbefore-mentioned parallelogram type linkage are substantially parallel.

As shown in FIG. 4 of the drawings, the rod 49 occupies a substantially horizontal position below the bolster 5 and extends in the direction of the left hand from the lever 29 in order that the jaws of the clevis 54 may be disposed on the opposite sides of the lower end of an obliquely arranged and upwardly extending lever 56 which is pivotally connected to the clevis 54 by any suitable means, such as, for example, a headed pin 57 and a cotter pin (not shown). The lever 56 extends upwardly through a central slot 58 formed in a strut 59 (FIGS. 1 and 4) that connects the compression member 60 and the tension member 61 of the truss-type brake beam 4. This lever 56 is pivotally mounted intermediate its ends on a headed pin 62 that has its opposite ends anchored in coaxial bores (not shown) formed in the strut 59. The jaws of the clevis 52 are disposed on the opposite sides of the lever 56 and are pivotally connected to this lever by means such as, for example, a headed pin 63 and a cotter pin (not shown) at substantially the same distance above the pin 62 that the pin 57 connects the clevis 54 to the lever 56 below the pin 62 whereby the levers 29 and 56 together with the rods 45 and 49 connected to these levers form a parallelogram type of linkage through which force may be transmitter from the piston 19 to the brake beam 4 to cause the brake shoes 10 carried by the beam 4 to be forced against the corresponding wheels 2 in response to the fluid under pressure supplied to pressure chamber 26 to move the piston 19 and brake cylinder body 15 in opposite directions.

In order to provide, in customary fashion, for operation of the brakes by hand brake means, the upper end of the lever 56 may be connected by a chain 64 (FIG. 1) to the hand brake wheel (not shown) which is located at one end of a railway car. Furthermore, so that the brake shoes 10 carried by the brake heads 6, which are integral with the cast brake beam 3, may be forced against the tread surface of the wheels 1, subsequent to movement of the brake shoes 10 carried by the brake heads 8 of the brake beam 4 into braking contact with the tread surface of the wheels 2, by force transmitted from the hand brake wheel to the brake beam 3 via the chain 64 and the parallelogram type of linkage including levers 56, 29 and rods 45 and 49, the right-hand side of the lower end of the lever 29 is disposed on the left-hand side of and against, as shown in FIG. 5, a web 65 that connects the lower arcuately converging ends of two otherwise parallel spaced-apart arms 66 and 67 (FIG. 2) of a hand brake member 68. These arms 66 and 67 are connected at their upper ends, as viewed in FIG. 2, by a V-shaped web 69 from the base of which extends a lever 70 having therein adjacent its upper end a bore 71. As shown in FIG. 5, the link at one end of a chain 72 passes through the bore 71 in the lever 70 and the link at the opposite end of this chain passes through a bore 73 provided in a lug 74 that is formed integral with the bottom of a car body 75, the chain 72 thus serving to connect or anchor the band brake member 68 to the car body 75.

As shown in FIG. 2 of the drawings, the arm 67 of the hand brake member 68 is disposed between the lower end of support member 39 of the bracket member 40 and one of a pair of lugs 76 formed integral with this bracket member and is rockably mounted on a hollow headed pin 77 which extends through coaxial bores provided in the support member 39, the arm 67 and the lug 76. This pin 77 is retained in place by a snap ring 78 inserted in a groove provided in that portion of the pin 77 extending beyond the lug 76. The other arm 66 of the hand brake member 68 is similarly rockably mounted on a hollow headed pin 79. These hollow pins provide for removal of the pin 33 after the cotter pins 34 are removed therefrom.

Each of the arms 30 and 31 of the hanger member 32 is provided on its lower end with a lug 80 integral therewith. Upon movement of the piston 19 (FIG. 1) toward the right-hand end of the cup-shaped body 15 by a conical type brake release spring 81 interposed between the piston 19 and an annular spring seat 82 disposed in surrounding relation to the hollow rod 18, the lugs 80 are moved into contact with corresponding stops 83 formed integral with and extending outward from the bracket member 40 prior to the piston 19 abutting the end wall of the cup-shaped body 15 it being noted that only one of these stops 83 appears in FIG. 1. The provision of the lugs 80 and stops 83 prevents the transmittal of a hammering force by the piston 19 to the end wall of the cup-shaped body 15 in response to undesired forces transmitted through the brake rigging to the piston 19 as a result of shock and vibration encountered by the brake rigging while a train is traveling at a high speed and the brakes are released.

As shown in FIG. 1, a hollow rod packing seal 84 constructed of some suitable resilient material such as, for example, rubber, is disposed in surrounding relation to the hollow rod 18 and is interposed between the spring seat 82 and an inturned flange also disposed in surrounding relation to the hollow rod 18 which flange is integral with a plate member 85 which rests against the right-hand side of the hereinbefore mentioned inturned flange 13.

*Operation*

In operation, when it is desired to effect a brake application, fluid under pressure is admitted to the chamber 26 by operation of the brake control valve device of the usual air brake system on railway cars under the control of the operator. Fluid under pressure thus supplied to the chamber 26 of the brake cylinder device 11 is effective to move the piston 19 and the body 15 in opposite directions. As the piston 19 and the brake cylinder body 15 are moved in opposite directions, the brake beam 3 on which the cylinder body 15 is mounted and the brake beam 4 are also moved in opposite directions since the piston 19 is connected to the brake beam 4 through push rod 20, fulcrum lever 27 which is integral with the push rod 20, and the parallelogram type of linkage which includes the levers 29 and 56 and the links 45 and 49, it being noted that the lever 56 is connected to the brake beam 4 via the strut 59 which is connected at its respective opposite ends to the compression member 60 and the tension member 61 of the brake beam 4. It will also be noted that since the fulcrum member 27 is connected by the pin 33 to the lever 29 midway between the pins 46 and 50, and the pin 62 connects the lever 56 to the strut 59 of the brake beam 4 midway between the pins 57 and 63, substantially equal forces are transmitted via links 49 and 45 to lever 56 and brake beam 4 without substantial relative movement between the links 49 and 45 and levers 29 and 56.

Furthermore, it can be seen from FIG. 2 of the drawings that the pin 33, which connects the fulcrum member 27 to the lever 29, extends through the arms 30 and 31 of the hanger member 32 which is rockably mounted on the pin 35. Therefore, the movement of the piston 19 and the brake cylinder body 15 in opposite directions in response to the supply of fluid under pressure to the chamber 26 is effective to rock the hanger member 32 clockwise, as viewed in FIG. 4, about the pin 35. It may be noted from FIG. 5 that at this time the lower end of the lever 29 is moved in the direction of the left hand away from the web 65 of the hand brake member 68 without any rocking of the lever 29 about the pin 33. Consequently, there is no rocking movement imparted to the hand brake member 68 and it remains motionless while a pneumatic power brake application is effected.

As the brake beams 3 and 4 move in opposite directions, the brake shoes 10 carried by those beams are brought into braking contact with the wheels of the truck to effect a braking action on these wheels.

As the brake beams 3 and 4 are moved, as described above, these beams are supported and guided by the guide feet 7 and 9 as each of these feet have sliding contact in a corresponding groove in the wear plate and guide members (not shown). As hereinbefore-mentioned, the orientation of the wear plates and the guide members is such that the brake beams 3 and 4 and the brake shoes 10 carried thereby are moved substantially radially toward the wheels.

It will be understood that, in view of the symmetrical disposition of the brake beams 3 and 4 on opposite sides of the truck bolster, and since the area of the piston 19 and the cup-shaped end of the body 15 are the same, the supply of fluid under pressure to the chamber 26 produces substantially equalized forces of application of all the brake shoes on the wheels.

When it is desired to release the brake application, the fluid under pressure previously supplied to the chamber 26 is vented in the usual manner through operation of the brake control valve device of the car brake system under the control of the operator, whereupon the force of the release spring 81 acting on the spring seat 82, which rests against the internal flange 13 of the brake beam 3, moves the brake cylinder body 15 and the piston 19 in a brake releasing direction to move the brake beams toward each other and the brake shoes carried thereby away from the tread surface of the wheels to a normal clearance position with respect to the tread surface of the wheels to effect a brake release.

Due to the inclination of the grooves in the wear plate and guide members, the brake beams tend to return by action of gravity to their normal symmetrical relation with respect to the truck bolster 5, in which position the clearance between the brake shoes on one brake beam and their associated wheels is substantially equal to the clearance between the brake shoes on the other brake beam and their associated wheels. However, due to the predominating weight of the brake beam 3 which carries the brake cylinder device 11 over the weight of the truss-type brake beam 4 which carries no brake cylinder, the tendency is for the brake beam 3 to travel by action of gravity, upon the release of fluid under pressure from the chamber 26 of the brake cylinder device 11, further down the inclined groove of the wear plate and guide members and thus past the normal intended release position. Therefore, in order to limit the travel of the heavier of the two brake beams towards its release position, each wear plate and guide member has the groove therein closed at its lower end. This closed end of the grooves consequently serves as limit stops to movement of the guide feet 7 of brake beam 3 toward the bolster 5.

It will be noted that it is not necessary to use a slack adjuster with this type of rigging. Since there are no links or levers between the brake cylinder device 11 and the brake beams 3, and there is no relative movement of the links and levers of the parallelogram type of linkage when a brake application is made by the supply of fluid under pressure to the chamber 26 of the brake cylinder device 11, there can be little or no wear of these links and levers which must be compensated for by a slack adjuster as in conventional braking rigging. It should be understood that the length of the bore in the cup-shaped body 15 of the brake cylinder device 11 is such as to provide sufficient travel for piston 19 in addition to that required to effect contact of the brake shoes with the wheel treads, that as the brake shoes 10 wear away, the shoes are always properly moved into braking contact with the treads of the wheels of a truck during each brake application throughout their useful life without the necessity of a slack adjuster to compensate for wear of the brake shoes, the slightly increased volume of displacement of the piston 19 in brake cylinder device 11 being so small as not to be reflected in an appreciably lower pressure of equalization therein.

Let it be supposed that the brakes are released and a trainman desires to effect a manual or hand brake application on a two-axle four-wheel car truck provided with the brake rigging constituting the present invention. To effect a manual brake application on the two-axle four-wheel car truck, the trainman will manually rotate the hereinbefore-mentioned hand brake wheel to which the chain 64 (FIG. 1) is connected to cause the application of a pull or force to this chain 64 in the direction of the left hand, as viewed in FIG. 1. The pull or force thus exerted on the chain 64 is transmitted to the lever 56 and is effective to rock this lever counterclockwise, as viewed in FIGS. 1 and 4, about the pin 62 which pivotally mounts the lever 56 on the truss-type brake beam 4. As the lever 56 is thus rocked counterclockwise about the pin 62, it is effective to transmit a thrust or pulling force to the rods 49 and 45, respectively. The rod 45 is connected to the lever 56 by pin 63 and clevis 52, and the rod 49 is connected to this lever by pin 57 and clevis 54. Consequently, it can be seen from FIGS. 1 and 4 that the pulling force transmitted to the rod 45 acts in the direction of the left hand and the thrust transmitted to the rod 49 acts in the direcion of the right hand.

As shown in the drawings, the rod 45 is connected by the clevis 44 and pin 46 to the upper end of the lever 29, and the rod 49 is connected by the clevis 48 and pin 50 to the lower end of the lever 29. Accordingly, the thrust or forces transmitted to the rods 45 and 49 product a couple on the lever 29 which couple acts in the direction to rock the lever 29 counterclockwise, as viewed in FIGS. 1 and 4, about the pin 33. It will be noted from FIG. 5 that the right-hand side of the lower end of the lever 29 abuts the web 65 that connects the lower ends of the arms 66 and 67 of the hand brake member 68 the upper end of which is connected by the chain 72 to the lug 74 which is integral with the bottom of the car body 75.

Furthermore, as shown in FIG. 2, the arms 66 and 67 of the hand brake member 68 are respectively connected by the pins 79 and 77 to the support members 38 and 39 and the lugs 76 all of which are integral with the bracket member 40 that is secured by the rivets 41 to the inturned flange 13 of the brake beam 3. Consequently, it will be apparent that the above-mentioned force or thrust acting in the direction of the right hand on the rod 49 is transmitted via the clevis 48, pin 50 and lower end of the lever 29 to the web 65 of the hand brake member 68 and acts thereon in the direction to rock this member 68 counterclockwise about its connection to the left-hand end of the chain 72 (FIG. 5). This counterclockwise rocking of the hand brake member 68 is effective to move the brake beam 3 in the direction of the right hand, as viewed in FIG. 1, since the pins 79 and 77 connect the arms 66 and 67 of member 68 to the support members 38 and 39 and to the lugs 76 of the bracket member 40 which is secured to the brake beam 3 as explained above. Accordingly, the brake beam 3 is thus moved in the direction of the right hand, as viewed in FIG. 1, until the brake shoes 10 carried by this beam 3 are brought into braking contact with the tread surfaces of the wheels 1.

It will be apparent that the brake beam 3 can move no further in the direction of the right hand, as viewed in FIG. 1, upon engagement of the brake shoes 10 carried by this brake beam with the tread surface of the wheels 1. It will be further apparent that the rod 49 cannot be moved in the direction of the right hand subsequent to engagement of the brake shoes 10 carried by the brake beam 3 with the tread surfaces of the wheels 1. Therefore, the pin 57 (FIGS. 1 and 4) now becomes the fulcrum member for the lever 56 and this lever is thereafter rocked counterclockwise about the pin 57 by the pull or force acting in the direction of the left hand on the chain 64 in response to rotation of the hand brake wheel by the trainman. Since the lever 56 is operatively connected by the pin 62 to the strut 59 of the truss-type brake beam 4, this counterclockwise rocking of the lever 56 about the pin 57 is effective to cause the brake beam 4 to be moved in the direction of the left hand, as veiwed in FIG. 1, until the brake shoes 10 carried by the brake beam 4 are brought into braking contact with the tread surface of the wheels 2. Furthermore, this counterclockwise rocking of the lever 56 is effective via the rod 45 to cause counterclockwise rocking of the lever 29 about the pin 50. Since lever 29 is connected by the pin 33 to the fulcrum member 27 which is integral with the push rod 20, this counterclockwise rocking of the lever 29 is effective to move the piston 19 in the direction of the left hand against the yielding resistance of spring 81.

It should be remembered that the guide feet 7 of the brake beam 3 and the guide feet 9 of the brake beam 4 move in the inclined grooves provided in the corresponding wear plate and guide member as these brake beams are moved in opposite directions, as viewed in FIG. 1, so that these brake beams and the brake shoes 10 carried by these brake beams are moved in a direction substantially radially of the associated wheels of the truck until each brake shoe is moved into braking contact with the tread surface of its corresponding wheel of the car truck. Thereafter, each brake shoe is pressed against the tread surface of its corresponding wheel with an equal force which is in accordance with the pull or force acting in the direction of the left hand on the chain 64 in response to rotation of the hand brake wheel by the trainman.

The manual brake application can be released by the trainman rotating the hand brake wheel at the end of the car in the direction to release the pull on the chain 64. When the tension or pull on the chain 64 is thus removed, the brake beams 3 and 4 and the brake shoes 10 carried thereby will be returned by gravity to the brake release position in the manner hereinbefore described.

It should be noted that, subsequent to effecting a pneumatic or power brake application, a trainman may rotate the hand brake wheel in the direction to produce a pull on the chain 64 which acts in the direction of the left hand, as viewed in FIG. 1. If now the hand brake wheel be locked against rotation by some suitable locking means (not shown), the brakes will remain applied to a degree in accordance with the pull or force acting in the direction of the left hand on the chain 64 even if all the fluid under pressure in the chamber 26 of the brake cylinder device 11 is lost by leakage therefrom.

Having now described the invention, what we claim as new and desire to secure by Letters Patent is:

1. A brake rigging for a four-wheel type of railway vehicle truck having a transverse axis and a longitudinal axis perpendicular thereto, which brake rigging comprises the combination of:
   (a) two brake beams extending in spaced substantially parallel relation to the transverse axis of the vehicle truck, and guidably supported at the ends thereof on the truck for bodily movement longitudinally of the truck,
   (b) a brake cylinder casing secured to one of said brake beams substantially midway the ends thereof and having its longitudinal axis parallel to and coplanar with the longitudinal axis of the truck,
   (c) a piston operable in said brake cylinder casing and cooperating therewith to form a pressure chamber in which fluid under pressure exerts a force on said piston, said piston having a piston rod movable therewith longitudinally of the truck, and
   (d) linkage means operatively connecting said piston rod and the other of said brake beams to transmit the fluid pressure force exerted on said piston to the other of said brake beams at a point substantially midway the ends thereof, thereby to effect movement of said brake beams away from each other in a brake-applying direction with respect to a corresponding wheel pair when said brake cylinder casing and said piston are caused to move in opposite directions relative to said truck in response to the supply of fluid under pressure to said pressure chamber.

2. A brake rigging for a four-wheel type of railway vehicle truck, as claimed in claim 1, further characterized in that said linkage means comprises a parallelogram of two links of substantially equal length and two levers of substantially equal length operatively connected by said links, and in that one of said two levers is pivotally mounted substantially midway its ends on the exterior end of said piston rod and the other of said two levers is pivotally mounted substantially midway its ends on the other of said brake beams.

3. A brake rigging for a four-wheel type of railway vehicle truck, as claimed in claim 2, further characterized in that said two levers are each inclined at substantially the same angle to the horizontal, and in that said two links extend longitudinally in parallel spaced-apart relationship to operatively connect said levers.

4. A brake rigging for a four-wheel type of railway vehicle truck, as claimed in claim 2, further characterized by a hand brake member pivotally mounted intermediate its ends on said one brake beam, and having one end anchored against movement and its opposite end disposed in the path of movement of said one lever so that a manual brake application can be effected in response to the application of a manual force to one end of the other of said levers.

5. A brake rigging for a four-wheel type of railway vehicle truck, as claimed in claim 2, further characterized by a hanger member pivotally mounted at one end on said one brake beam, said hanger member being operatively connected at its opposite end to said one lever whereby said hanger member supports one end of said parallelogram type of linkage via said one lever.

6. A brake rigging for a four-wheel type of railway vehicle truck, as claimed in claim 2, further characterized in that said other brake beam is a truss-type brake beam having a strut on which is pivotally mounted one of the said two levers of said linkage means.

7. A brake rigging for a four-wheel type of railway vehicle truck having a longitudinal axis and a transverse axis perpendicular thereto and also coplanar with a bolster of the truck, the bolster being provided with a window therein, which brake rigging comprises the combination of:
   (a) two brake beams extending in spaced substantially parallel relation to the transverse axis of the vehicle truck, and guidably supported on the truck for bodily movement longitudinally of the truck,
   (b) a brake cylinder casing secured to one of said brake beams substantially midway the ends thereof and having its longitudinal axis parallel to and coplanar with the longitudinal axis of the truck,
   (c) a piston operable in said brake cylinder casing and cooperating therewith to form a pressure chamber in which fluid under pressure exerts a force on said piston, said piston having a piston rod movable therewith longitudinally of the truck, and
   (d) a parallelogram type of linkage connecting said piston rod and the other of said brake beams and having two links of substantially equal length and two levers of substantially equal length operatively connected by said links one of which extends through the window in the bolster and the other of which extends parallel to said one link and below the bolster,
   (e) said linkage being effective to transmit the fluid pressure force exerted on said piston to the other of said brake beams substantially midway the ends thereof thereby to effect movement of said brake beams away from each other in a brake-applying direction with respect to a corresponding wheel pair when said brake cylinder casing and said piston are caused to move in opposite directions relative to said truck in response to the supply of fluid under pressure to said pressure chamber.

8. A brake rigging for a two-axle four-wheel truck of a railway vehicle having a body supported in part by the truck, which rigging comprises the combination of:
   (a) a fluid power operated braking mechanism including a brake cylinder and a parallelogram type of linkage having a pair of levers and a pair of links connecting said levers through which a braking force is transmitted from the brake cylinder to the wheels of the truck, and
   (b) a hand brake member pivotally mounted intermediate its ends on said brake cylinder and having one end anchored to the vehicle body and its opposite end disposed in the path of movement of one of said pair of levers so as to act in cooperation therewith in response to the application of a manual force to the other of said pair of levers to cause a brake application to be effected manually through said linkage.

9. A brake rigging for a four-wheel type of railway vehicle truck, as claimed in claim 4, further characterized by support means pivotally mounted on said one brake beam for pivotally supporting thereon said one lever and the exterior end of said piston rod, whereby said piston rod and said piston are moved relative to said brake cylinder casing in response to the application of a manual force to said one end of the other of said levers.

10. A brake beam for a railway vehicle truck, said beam having a shallow V-shape and comprising a H-channel member having a web along the length thereof, said web having a transverse tubular portion substantially at the apex of the V-portion of the beam, and a brake cylinder device removably disposed in said tubular portion said device having intermediate its ends an outturned annular flange for abutting contact with a flange of the H-channel member, whereby the brake cylinder device may be removably secured to said brake beam.

References Cited
UNITED STATES PATENTS

| | | | |
|---|---|---|---|
| 499,553 | 6/1893 | Kirker | 188—52 |
| 2,112,530 | 3/1938 | Holloway | 188—53 X |
| 2,966,963 | 1/1961 | Williams | 188—52 |

DUANE A. REGER, *Primary Examiner.*